(12) United States Patent
Riedl et al.

(10) Patent No.: US 11,770,315 B2
(45) Date of Patent: Sep. 26, 2023

(54) ARTIFICIAL INTELLIGENCE BASED DEVICE IDENTIFICATION

(71) Applicant: Siemens Canada Limited, Oakville (CA)

(72) Inventors: Johannes Riedl, Landshut (DE);
Mirjana Zafirovic-Vukotic, Maple (CA); Anas Hawari, Mississauga (CA);
Axel Gruner, Nuremberg (DE)

(73) Assignee: Siemens Canada Limited, Oakville (CA)

( * ) Notice: Subject to any disclaimer, the term of this patent is extended or adjusted under 35 U.S.C. 154(b) by 0 days.

(21) Appl. No.: 17/997,851

(22) PCT Filed: May 28, 2020

(86) PCT No.: PCT/US2020/034769
§ 371 (c)(1),
(2) Date: Nov. 3, 2022

(87) PCT Pub. No.: WO2021/242237
PCT Pub. Date: Dec. 2, 2021

(65) Prior Publication Data
US 2023/0155905 A1    May 18, 2023

(51) Int. Cl.
*G06F 15/173* (2006.01)
*H04L 43/062* (2022.01)
(Continued)

(52) U.S. Cl.
CPC ............ *H04L 43/062* (2013.01); *H04L 41/16* (2013.01); *H04L 43/045* (2013.01)

(58) Field of Classification Search
CPC ...... H04L 43/062; H04L 41/16; H04L 43/045
See application file for complete search history.

(56) References Cited

U.S. PATENT DOCUMENTS 10,826,902 B1 *  11/2020  Aksu .................. H04L 41/14
11,611,532 B1 *  3/2023  Haefner .............. G16Y 30/10
(Continued)

FOREIGN PATENT DOCUMENTS

WO    2016026510 A1    2/2016

OTHER PUBLICATIONS

NPL, Networking at Layer 2: Forwarding VLAN Tagged Frames, Aug. 2017, (Year: 2017).*
(Continued)

*Primary Examiner* — Padma Mundur (57) ABSTRACT

A system for obtaining information about an Internet of Things (IoT) device connected to a network includes a data traffic collection point, a data processing module and an artificial intelligence module. The data traffic collection point collects data units communicated to or from a specified IoT device of a plurality of IoT devices connected to a network. The data processing module processes quantitative information pertaining to the data units communicated to or from the specified IoT device collected over a defined time interval, to create a temporal data traffic fingerprint of the specified IoT device. The artificial intelligence module utilizes a machine learning model to deduce device identifying information of the specified IoT device from the temporal data traffic fingerprint of the specified IoT device.

18 Claims, 5 Drawing Sheets

(51) Int. Cl.
   *H04L 41/16* (2022.01)
   *H04L 43/045* (2022.01)

(56) References Cited

U.S. PATENT DOCUMENTS

| | | | |
|---|---|---|---|
| 2016/0139575 A1* | 5/2016 | Funes | G06N 5/047 |
| | | | 700/275 |
| 2020/0092704 A1* | 3/2020 | Singh | H04L 67/10 |
| 2021/0203615 A1* | 7/2021 | Roy | G06N 20/00 |
| 2022/0263857 A1* | 8/2022 | Prusov | H04L 63/1408 |

OTHER PUBLICATIONS

NPL, A Small Study in Ethernet Frame Size distribution, from Reddit dot com in 2014 (Year: 2014).*

Julio Hoffimann et al.: "Sequence Mining and Pattern Analysis in Drilling Reports with Deep Natural Language Processing", arxiv.0rg, Cornell University Library, 201 Olin Library Cornell University Ithaca, NY 14853, Dec. 5, 2017 (Dec. 5, 2017), XP080844742.

International Search Report corresponding to PCT/US2020/034769; 5 pages.

Markus Miettinen Ahmad-Reza Sadeghi et al. "IOT Sentinel: Automated Device-Type Identification for Security Enforcement in IoT"; Dec. 13, 2016.

* cited by examiner

ARTIFICIAL INTELLIGENCE BASED DEVICE IDENTIFICATION

This application is a national phase filing under 35 U.S.C. § 371 of International Patent Application No. PCT/US2020/034769, filed May 28, 2020, which is incorporated herein by reference in its entirety.

TECHNICAL FIELD

The present disclosure relates generally to the field of network management in an Internet of Things (IoT) environment, and in particular, to a technique for obtaining information pertaining to IoT devices connected to a network.

BACKGROUND

An IoT installation may include a plethora of IoT devices connected to network. The IoT devices may include, for example, one or more of sensors, actuators, controllers, network components, among others. In many IoT installations, no sufficient documentation of the overall setup (for example, devices installed, properties of the installed devices, etc.) is available or the available documentation is outdated. Device information can be collected via utilizing network management tools. Known network management tools typically require end devices to support specific protocols, such as SNMP, ICMP, LLDP among others, to allow visibility of these devices.

SUMMARY

Briefly, aspects of the present disclosure are directed to an artificial intelligence based technique for obtaining information pertaining to IoT devices connected to a network.

In a first aspect, a system for obtaining information about an IoT device connected to a network is disclosed. The system comprises a data traffic collection point configured to collect data units communicated to or from a specified IoT device of a plurality of IoT devices connected to a network. The system further comprises a data processing module configured to process quantitative information pertaining to the data units communicated to or from the specified IoT device collected over a defined time interval, to create a temporal data traffic fingerprint of the specified IoT device. The system further comprises an artificial intelligence module configured to utilize a machine learning model to deduce device identifying information of the specified IoT device from the temporal data traffic fingerprint of the specified IoT device.

In a second aspect, a computer-implemented method for obtaining information about an IoT device connected to a network is disclosed. The method comprises receiving a collection of data units communicated to or from a specified IoT device of a plurality of IoT devices connected to a network. The method further comprises processing quantitative information pertaining to the data units communicated to or from the specified IoT device collected over a defined time interval, to create a temporal data traffic fingerprint of the specified IoT device. The method further comprises deducing device identifying information of the specified IoT device from the temporal data traffic fingerprint of the specified IoT device using a machine learning model.

Other aspects of the present disclosure implement features of the above-described method in computing systems and computer program products.

Additional technical features and benefits may be realized through the techniques of the present disclosure. Embodiments and aspects of the disclosure are described in detail herein and are considered a part of the claimed subject matter. For a better understanding, refer to the detailed description and to the drawings.

BRIEF DESCRIPTION OF THE DRAWINGS

The foregoing and other aspects of the present disclosure are best understood from the following detailed description when read in connection with the accompanying drawings. To easily identify the discussion of any element or act, the most significant digit or digits in a reference number refer to the figure number in which the element or act is first introduced.

DETAILED DESCRIPTION

Various technologies that pertain to systems and methods will now be described with reference to the drawings, where like reference numerals represent like elements throughout. The drawings discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged apparatus. It is to be understood that functionality that is described as being carried out by certain system elements may be performed by multiple elements. Similarly, for instance, an element may be configured to perform functionality that is described as being carried out by multiple elements. The numerous innovative teachings of the present disclosure will be described with reference to exemplary non-limiting embodiments.

Aspects of the present disclosure are directed to an artificial intelligence (AI) based technique for obtaining information pertaining to IoT devices connected to a network. An underlying idea here is to use information on the data traffic being sent to or from a specified IoT device to deduce device identifying information, such as device type, and in some cases, device type variant. The device identifying information is deduced from a data traffic fingerprint of the specified IoT device using a machine learning model. The model may be trained on prior data to learn data traffic fingerprints that characterize the behavior of a large number of device types/device type variants.

The present inventors have recognized that the fundamental behavior of an IoT device concerning data communication distinctly characterizes a device type or even a device type variant in some cases. The fundamental behavior concerning data communication may be analyzed, for example, based on used protocols, or data prioritization classes, or intensity of communication, or characteristics of data exchanged (such as packet length, selected contents, etc.), or any combinations thereof. The inventive concept makes it possible to obtain information on IoT devices that have connectivity to a network without relying on the capabilities (such as supporting specific protocols) of these devices or necessitating adaptations on the device side.

Figure 1:
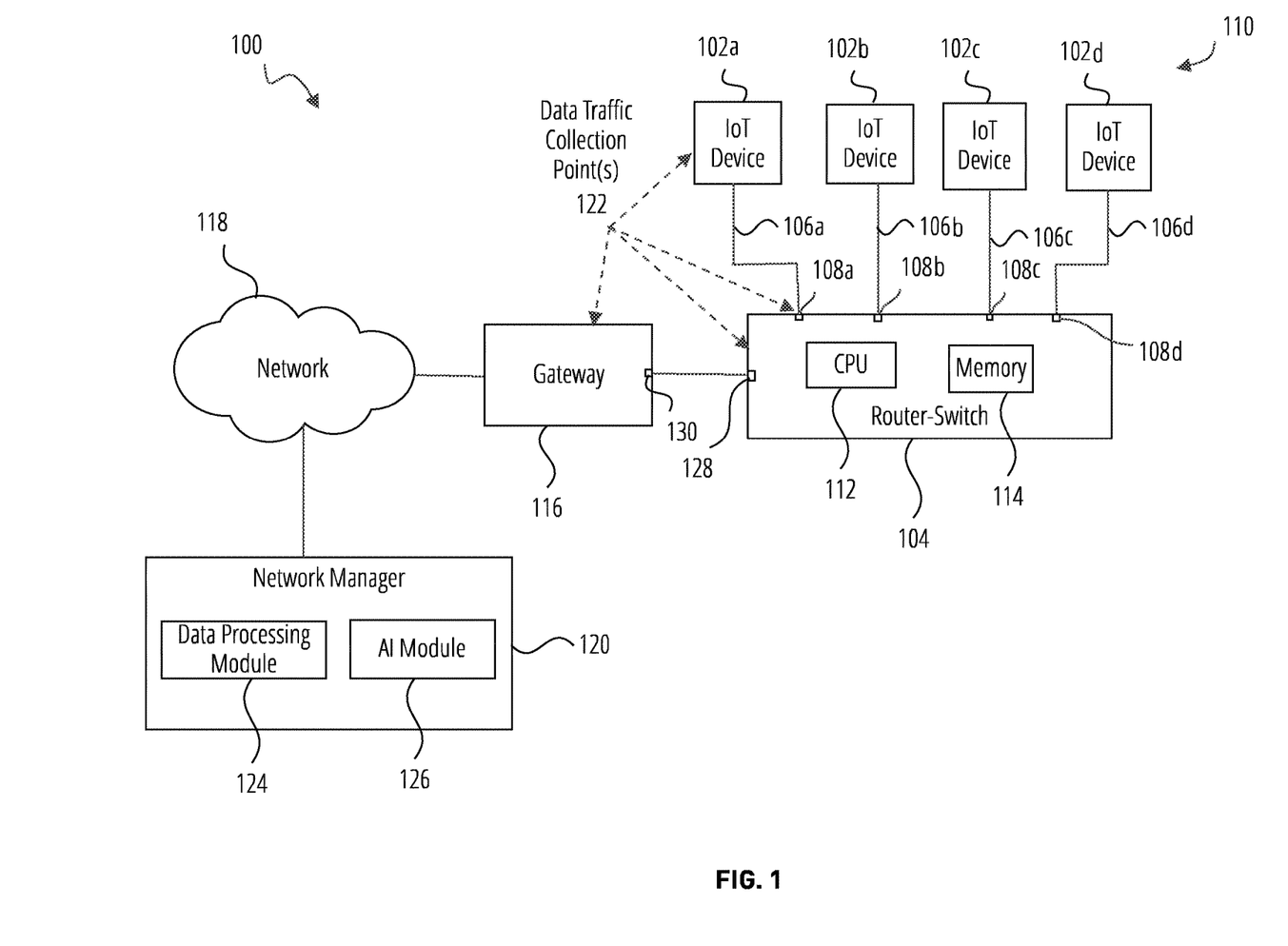
FIG. 1 illustrates a system for obtaining device information according to an aspect of the present disclosure.

Referring now to the drawings, FIG. 1 shows a system 100 according to an illustrative example embodiment. The system 100 is configured to obtain device information pertaining to one or more IoT devices that are connected to a network 110. The network 110 may include, for example and without limitation, a local area network (LAN), a wireless local area network (WLAN), a wide area network (WAN), among several others. IoT devices 102a, 102b, 102c, 102d may communicate data over the network 110 via one more network components such as switches, routers, etc. In the illustrative example of FIG. 1, four IoT devices 102a, 102b, 102c, 102d are identified, which are linked to a router-switch 104 at respective ports 108a, 108b, 108c, 108d via respective links 106a, 106b, 106c, 106d. The links 106a-d may comprise, for example, Ethernet cables. In various embodiments, one or more of the IoT devices 102a-d may be connected to the router-switch 104 wirelessly, for example, via wireless access points (not shown). In some embodiments, the router-switch 104 may be configured to also function as a wireless access point. In one embodiment, the router-switch 104 may have a modular architecture configured to support connections through several other types of interfaces, such as serial interfaces, T1 interfaces, among others.

The router-switch 104, also referred to as a multi-layer switch, is a single device configured to carry out switching and routing functions. The router-switch 104, acts as a switch to connect devices that are on the same subnet or virtual LAN and has IP routing intelligence built into it to double up as a router. The router-switch 104 is provided with processing capability, and comprises, for example a CPU 112 and a memory 114. The router-switch 104 can thus support routing protocols, inspect incoming data packets, and can even make routing decisions based on the source and destination addresses. In other embodiments, a switch and a router may be employed as separate devices. In still other embodiments, the routing and switching functions may be implemented by other network components, including but not limited to a network security device, such as a firewall. One skilled in the art will appreciate that although a single router-switch 104 is shown, in practice, a typical IoT installation would comprise several routing and/or switching devices connected to a plethora of IoT devices.

The network 110 also includes a node that functions as gateway 116. The gateway 116 may include a router, a firewall, a server, or any other device that enables data traffic to flow between the devices of the network 110 and one or more external networks 118, including, but not limited to, the Internet.

The term "Internet of Things Device" or "IoT device" is used herein to refer to a device capable of sending and/or receiving data over a network without requiring human-to-human or human-to-device interaction. Non-limiting examples of IoT devices include various types of sensors, actuators, controllers (e.g., programmable logic controllers), intelligent electronic devices, servers, as well as network components such as routers, switches, firewalls, etc. Thus, it should be appreciated that while the IoT devices 102a-d and the network components, such as the router-switch 104 and the gateway 116, are separately identified in FIG. 1 for the purpose of illustration, each of these devices is understood to be an IoT device within the context of the present description and the claims.

The network 110 is connected to a network manager 120, which may be configured, among several functions, to obtain device information of connected IoT devices, in accordance with an embodiment of the present disclosure. The network manager 120 may comprise a computing system including one or more computing devices, such as that described in FIG. 5. In a non-limiting example embodiment, the network manager 120 may be implemented in a cloud computing environment. In certain other embodiments, the aspect of obtaining device information of connected IoT devices may be implemented in a network node having the required computing capability, including, for example, the router-switch 104.

The system for obtaining device information according to the present disclosure includes a plurality of elements/modules as described below. These elements/modules may be distributed over multiple computing devices, or may be embedded in a single device, such as the router-switch 104, among others.

Broadly, the system 100 includes one or more data traffic collection points 122, a data processing module 124 and an AI module 126. A data traffic collection point 122 collects data units communicated to or from a specified IoT device out of several IoT devices connected to the network 110. The term "or" in this context is meant in an inclusive sense, and is understood to mean "and/or." That is, "data units communicated to or from a specified IoT device" should be understood to mean data units received by the specified IoT device and/or data units sent by the specified IoT device. For the purpose of illustration, the specified IoT device is identified herein as the device 102a, it being understood that the described technique may be correspondingly applied to other IoT devices connected to the network 110. The data processing module 124 processes quantitative information pertaining to the data units communicated to or from the specified IoT device 102a collected over a defined time interval, to create a temporal data traffic fingerprint of the specified IoT device 102a. A temporal data traffic fingerprint of a device is a temporary snapshot of a behavior of the device in a defined time interval that is characterized by quantitative properties of data units sent and/or received by the device in the defined time interval. The AI module 126 utilizes a machine learning model to deduce device identifying information of the specified IoT device 102a from the temporal data traffic fingerprint of the specified IoT device 102a. The term "deduce" is used herein in the sense of logically concluding or drawing an inference (for example, based on defined rules) by a trained machine learning model, from input data which includes the temporal data traffic fingerprint.

The term "data unit" or protocol data unit (PDU) refers to a single unit of information transmitted between entities of a network, in the form of electrical signals. A data unit is composed of protocol-specific control information and payload. For example: at the data link layer, a data unit refers to a frame; at the network layer, a data unit refers to a packet; at the transport layer, a data unit refers to a segment; and so on. The term "data unit", as used in the present description and the claims, is thus to be understood in the broadest sense to refer to any PDU.

A data traffic collection point 122 is a point where data traffic to or from specified IoT device, and/or traffic related counters and/or other quantitative measures is/are collected. A data traffic collection point 122 for a specified IoT device may be established at one or more of several possible points. In a first embodiment, a data traffic collection point 122 for a specified IoT device 102a may be the device 102a itself. In a second embodiment, a data traffic collection point 122 for a specified IoT device 102a may be a node of the network 110 via which data units communicated to or from the device 102a passes. Such nodes may include, for example, network components, such as routers, switches, gateways, etc. In the shown embodiment, a data traffic collection point 122 for the specified IoT device 102a may be established at the router-switch 104 or the gateway 116. In a third embodiment, a data traffic collection point 122 for a specified IoT device 102a may simply be a port of a network component linked to the device 102a, such as the port 108a of the router-switch 104. Data traffic collection points for other IoT devices connected to the network may be similarly established.

A data traffic collection point 122 may be configured to filter out data traffic communicated to or from a specified IoT device 102a in several ways.

In a first example of data traffic filtering, the data traffic collection point 122 may collect data units communicated to or from the specified IoT device 102a based on a device address of the specified IoT device 102a. The device address may include, for example, a MAC address or an IP address of the device 102a. In various embodiments, where the specified IoT device 102a belongs to a virtual local area network (VLAN), the device address used for filtering data traffic may also include a VLAN identifier, which may be mapped to a MAC address or an IP address. In still other embodiments, the filtering of data traffic may be based on a device address/identifier encapsulated via various technologies, such as Ethernet VPN, VXLAN, MAC on MAC, among others. This sort of data traffic filtering by device address/identifier may be implemented, for example, by the router-switch 104 or the gateway 116.

In a second example of data traffic filtering, the data traffic collection point 122 may collect data units communicated via a physical port (e.g., port 108a) linked to the specified IoT device 102a. In some embodiments, for example but not limited to a VLAN, a physical port may have one or more virtual (or logical) interfaces configured on it. In such cases, only data traffic through the virtual interface linked to the specified IoT device may be filtered out.

In a third example of data traffic filtering, the data traffic collection point 122 may collect data units communicated via a circuit comprising a combination of physical ports and/or virtual interfaces linked to the specified IoT device. As an example, in the configuration shown in FIG. 1, if the gateway 116 is used as a data traffic collection point for the IoT device 102a, data traffic communicated via the following circuit may be filtered out, where the circuit comprises an interconnection between: the port 130 of the gateway 116 (or a virtual interface configured on the port 130), the port 128 of the router-switch 104 (or a virtual interface configured on the port 128) and the port 108a of the router-switch 104 (or a virtual interface configured on the port 108a).

The data processing module 124 is implemented by a device that transforms quantitative properties of the data units sent/received by the specified IoT device 102a over a defined time interval into a temporal data traffic fingerprint of the specified IoT device 102a. The data processing module 124 may be implemented at the device where the data traffic is collected, or at a different processing device, for example, by mirroring of the data traffic. In the example shown in FIG. 1, the data processing module 124 resides in the network manager 120.

In an exemplary embodiment, the data processing module 124 may be configured to process quantitative information to create statistical information pertaining to the data units sent and/or received by the specified IoT device over the defined time interval. The statistical information may relate to, for example, used communication protocols, which may include protocols at the data link layer and/or network layer, data prioritization classes, and other characteristics such as length or selected contents of the data units.

Figure 2:
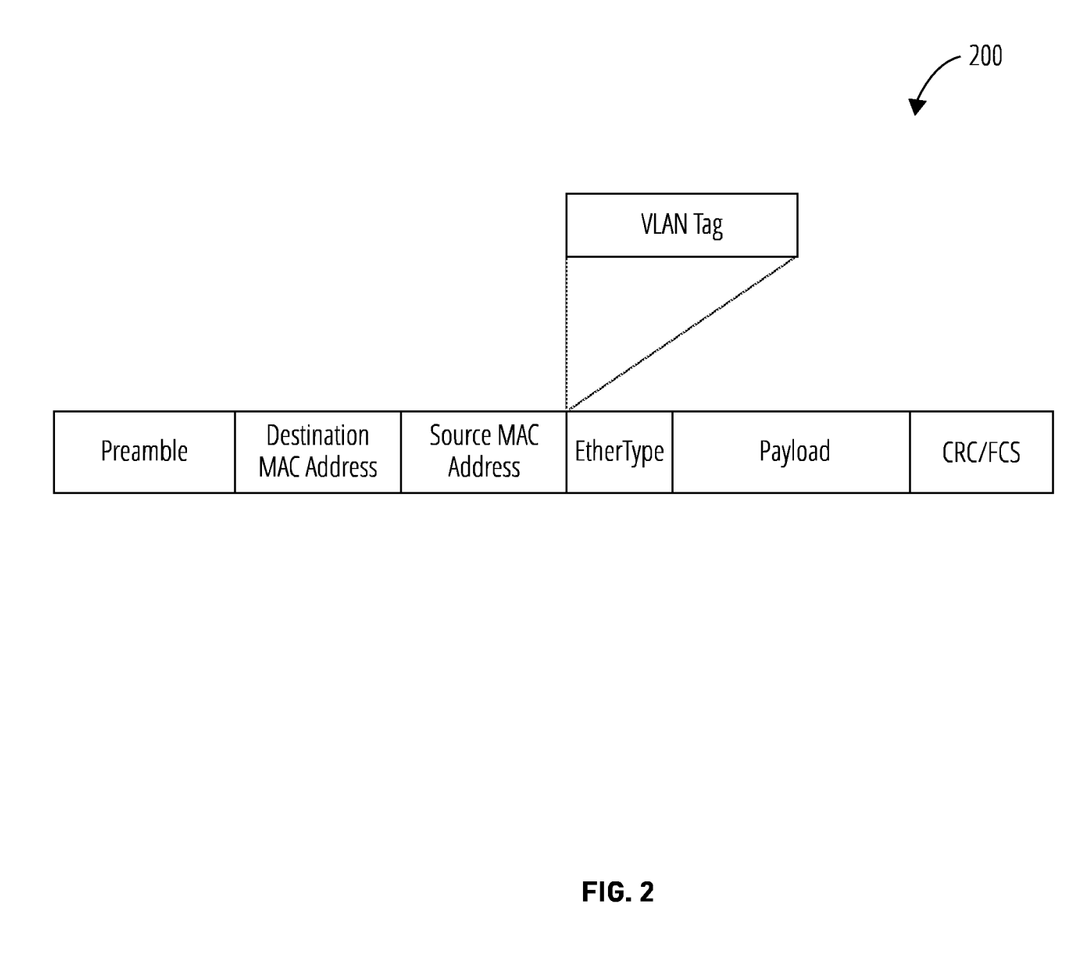
FIG. 2 illustrates a known type of Ethernet frame.

The statistical information may include, for example, the number of data units per time interval per protocol or per a selected set of protocols. In one embodiment, information on protocols from Ethernet frames (data units in data link or Ethernet layer) that are sent/received by the specified IoT device may be obtained from an EtherType value. As shown in FIG. 2, EtherType is a two-octet field in an Ethernet frame 200 whose value indicates which protocol is encapsulated in the payload field (e.g., IPv4, IPv6, routing protocols such as OSPF, ISIS among many others). Plotting number of Ethernet frames per time interval per EtherType value provides a convenient technique for creating statistical information on certain communication protocols that may characterize the behavior of the specified IoT device.

Alternately, or additionally, the statistical information may include the number of data units per time interval per data prioritization class. An example of a data prioritization class is a quality-of-service (QoS) class according to IEEE 802.1p, which may be encapsulated in certain Ethernet frame formats that includes a VLAN tag (according to IEEE 802.1Q) between the source MAC address and the EtherType fields, as shown in FIG. 2. Another example of a data prioritization class includes a differentiated services code point (DSCP) marking, which is specified in a network layer data packet.

While only specific examples have been described in connection with encapsulated protocols, data prioritization classes etc., it will be appreciated that the described approach may be applied to several other encapsulation technologies, such as Ethernet VPN, VXLAN, MAC on MAC, among many others.

Alternately, or in addition to the above, the statistical information may relate to characteristics of the data units sent/received by the specified IoT device, such as data unit length distribution per time interval and/or statistics on selected contents of payload of the data units (e.g., data segment containing part of a video stream, application layer protocols such as HTTP, HTTPS, etc.) per time interval, which may distinctly characterize the specified IoT device.

The AI module 126 receives, as input, the statistical information from the data processing module 124. The statistical information, which may be pre-processed prior to being forwarded to the AI module 126, represents a temporal data traffic fingerprint of the specified IoT device 102a. The AI module 126 employs a trained machine learning model. The machine learning model may be trained on prior data to learn data traffic fingerprints that characterize the behavior of a large number of device types/device type variants. In one embodiment, based on the training data, the machine learning model may be configured to define rules for how to deduce, from the input temporal data traffic fingerprint of the IoT device 102a, device identifying information of the IoT device 102a. Although the AI module 126 is shown to reside in the network manager 120, it will be appreciated that the AI module 126 may reside in other devices, including but not limited to, the router-switch 104. In some embodiments, the AI module 126 may be distributed across multiple computing devices.

The device identifying information deduced by the AI module 126 may include information on device type. For example, the device identifying information may specify whether the specified IoT device 102a is a sensor, an actuator, a controller, a switch, a router, a server, etc. Depending on the specificity of the temporal data traffic fingerprint of the IoT device 102a, the device identifying information may further include information on device type variant. For example, the device identifying information may specify whether the specified IoT device 102a is a temperature or a pressure sensor, a file server or a web server, a device communicating using a specific IoT protocol (such as PROFINET, GOOSE, etc.), device release, release date, and so on.

The described technique may be combined, for example, with analyzing the source MAC address of data units received from the IoT device 102a or of the destination MAC address of data units sent to the IoT device 102a, to identify a manufacturer of the IoT device 102a based on the first 6 digits of this MAC address and a lookup in a respective table.

In a specific embodiment of the above-described technique, the data processing module 124 may create a graphical image from the quantitative information pertaining to data units sent/received by the specified IoT device 102a over a defined time interval. The graphical image is a digital image which is typically, but not necessarily limited to, a two-dimensional image. In various embodiments, the graphical image representing the temporal data traffic fingerprint of the specified IoT device 102a may be created based on statistical information, which may, for example, be related to one or more of: used protocols, data prioritization classes, data unit length distribution, selected contents of the data units, and so on.

Figure 3:
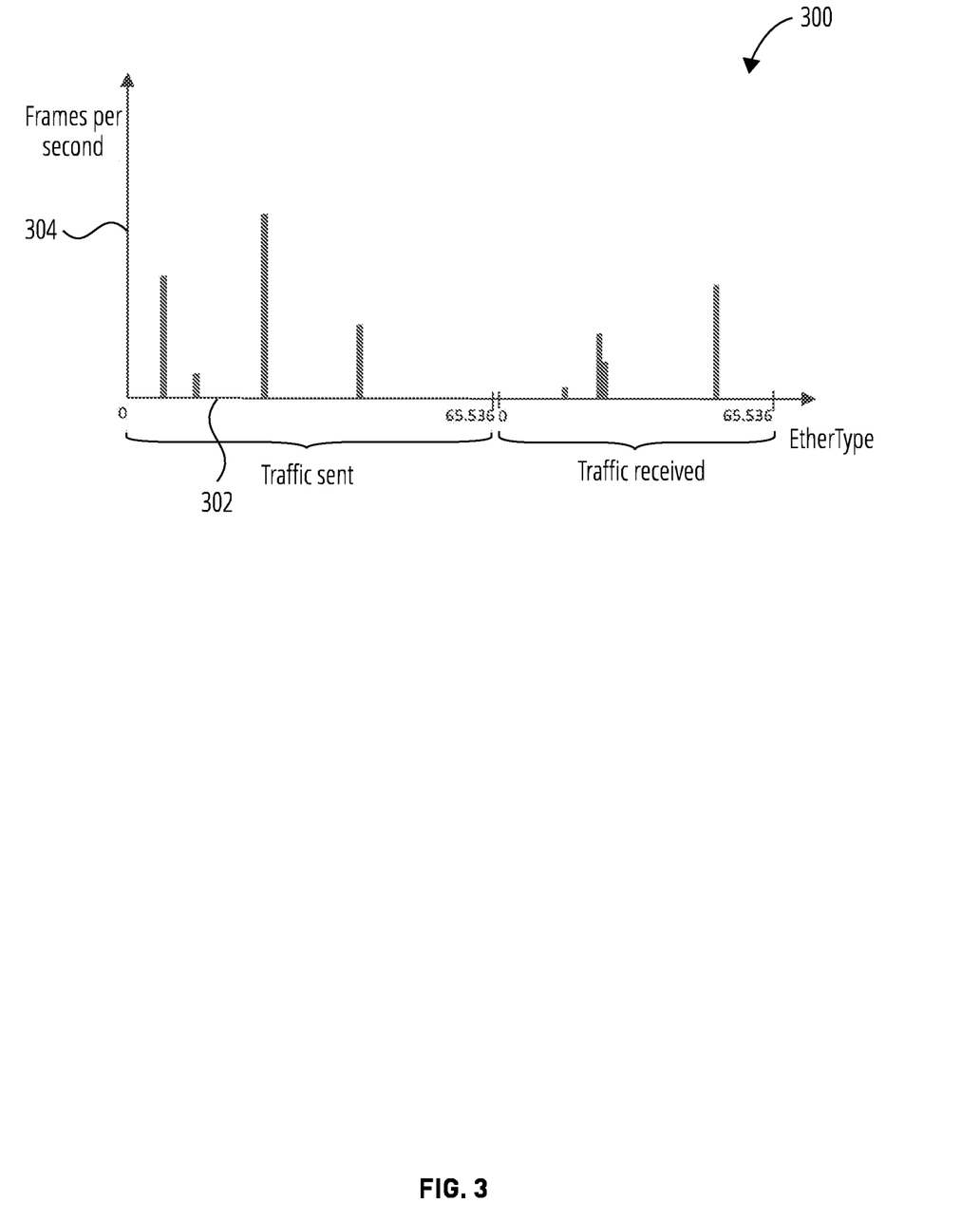
FIG. 3 illustrates an example of a graphical image representing a data traffic fingerprint of a device.

FIG. 3 shows a simplified example of a two-dimensional image 300 created from statistical information related to EtherType values. Here, all possible EtherType values, first for sent data frames, then for received data frames, are plotted along the x-axis 302. The number of data frames sent/received per second for the specific EtherType value is drawn along the y-axis 304. The two-dimensional image of the resultant histogram represents a temporal data traffic fingerprint of the specified IoT device 102a. The image 300 may be pre-processed and forwarded to the AI module 126. The AI module 126 classifies the graphical image 300 representing the temporal data traffic fingerprint into one of many learned data traffic fingerprint types, to deduce the device identifying information of the specified IoT device 102a. The graphical image 300 is temporal and is expected to change at different intervals of time. The statistical parameters are chosen such that the characteristics of the graphical image are still strong enough to distinctly associate the behavior of the specified IoT device 102a to a learned device type (analogous to an AI based identification of a cat or dog). For this purpose, the AI module 126 may employ a classification type machine learning model implemented using artificial neural networks and realized using machine learning tools, which include, for example, open-source software such as TensorFlow, or commercial tools, which may or may not be enhanced by AI acceleration hardware.

In other embodiments, alternate to or in addition to creating statistical information, other techniques may be utilized to process quantitative information from the data units sent/received over a defined time interval to create a temporal data traffic fingerprint of the specified IoT device. As an example, the data processing module 124 may be configured to create a time series from the data units sent and/or received by the specified IoT device 102a over the defined time interval. The time series may be based on data points, for example, relating to used communication protocols, which may include protocols at the data link layer and/or network layer, data prioritization classes, and other characteristics such as length or selected contents of the data units. A time series may be used to create a data traffic fingerprint based on a dynamic behavior of the specified IoT device 102a (for example, a burst of data traffic of a first type followed by a burst of data traffic of a second type, etc.). The machine learning model in the AI module 126 may be fed, in the training phase, with data, for example, including a large number of figures (graphical images) and/or numerical data depicting a snapshot of devices' behavior in terms of sending and/or receiving data traffic over time.

The technique described herein may find application, for example, in network trouble shooting. In one application, the described technique may be integrated into network maintenance and management tools. In another application, the described technique may be used as an aid when extending an existing network.

The described technique realizes a number of practical benefits. For example, the described technique requires no specific knowledge by an operator of a device identification system. Furthermore, the rules for correct identification are not required to be manually designed or thought through. Using machine learning methods obviate the need to pre-define complex decision rules manually. On device side, the described technique is non-intrusive, requiring no specific adaptations or capabilities, whereby the technique may also work for third-part devices. Moreover, the described technique is flexible in terms of which communication properties are looked at, how many parameters are used, etc., and could also be combined with non-communication parameters and/or properties.

Figure 4:
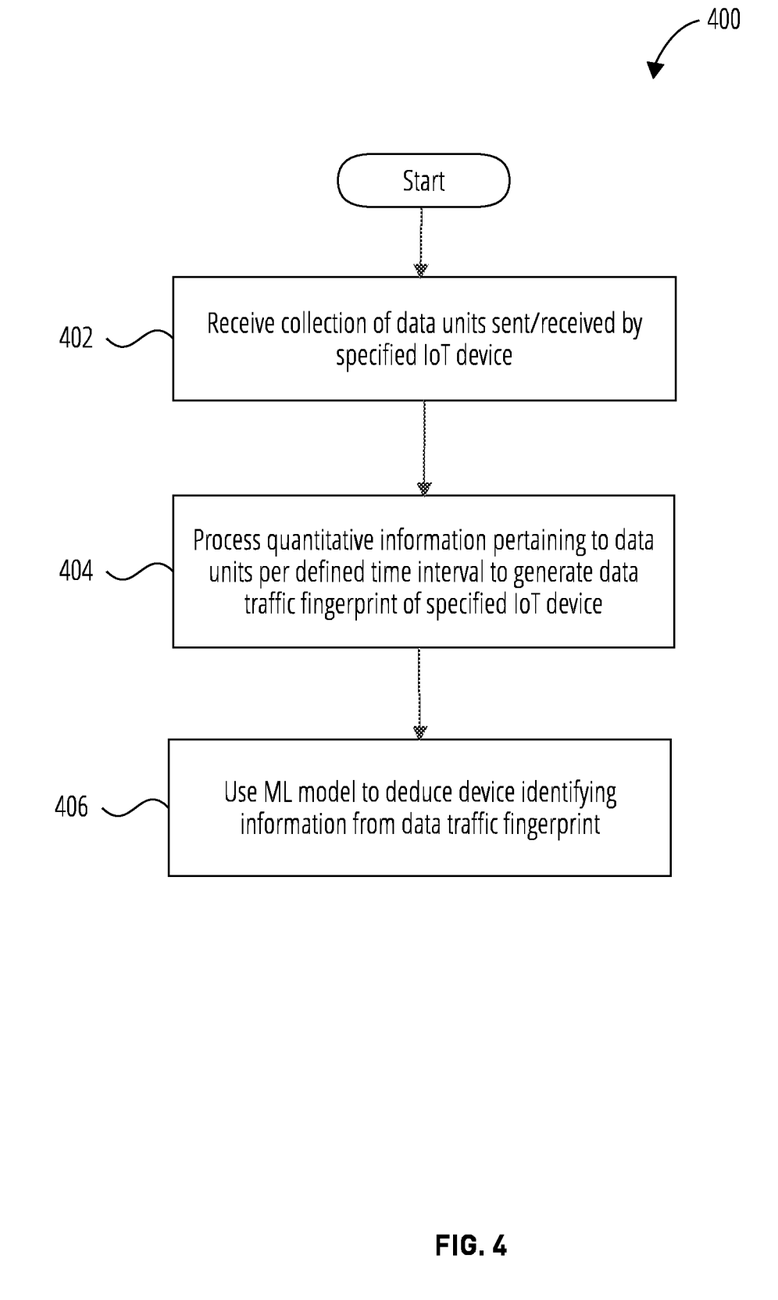
FIG. 4 is a flowchart illustrating a computer-implemented method for obtaining device information according to an aspect of the present disclosure.

FIG. 4 illustrates computer-implemented method 400 for obtaining device information according to an aspect of the present disclosure. The method may be executed by a computing device, such as the network manager 120, the router-switch 104, among others, or may be executed over multiple computing devices. In one embodiment, the method 400 may be executed as a cloud service. FIG. 4 is not intended to indicate that the operational blocks of the method 400 are to be executed in any particular order, or that all of the blocks of the method 400 are to be included in every case. Additionally, the method 400 can include any suitable number of additional operations.

Block 402 of the method 400 involves receiving a collection of data units sent and/or received by a specified IoT device out of a plurality of IoT devices connected to a network. In one embodiment, block 402 may involve receiving the data units sent and/or received by the specified IoT device from a data traffic collection point via mirroring of the data traffic. As described above, the data traffic collection point may be, for example, the specified IoT device itself, or a node of the network via which data units communicated to or from the specified IoT device passes, or a port of a network component linked to the specified IoT device.

Block 404 of the method 400 involves processing quantitative information pertaining to the data units collected over a defined time interval to generate a temporal data traffic fingerprint of specified IoT device. As described above, processing the quantitative information may comprise, for example, creating statistical information pertaining to the data units collected over the defined time interval. The statistical information may comprise one or more of: number of data units per time interval per protocol or per a selected set of protocols, number of data units per time interval per data prioritization class, data unit length distribution per time interval, and statistics on selected contents of payload of the data units per time interval. Alternate to or in addition to creating statistical information, other techniques (e.g., creating a time series) may be utilized process quantitative information from the data units collected over a defined time interval to create a temporal data traffic fingerprint of the specified IoT device. In one embodiment, block 404 may involve creating a graphical image from the quantitative information, the graphical image representing the temporal data traffic fingerprint of the specified IoT device.

Block 406 of the method 400 involves deducing device identifying information of the specified IoT device using a machine learning model, based on the temporal data traffic fingerprint of the specified IoT device. The machine learning model may be trained on prior data to define rules for how to deduce device identifying information from the input temporal data traffic fingerprint of the IoT device. In one embodiment, block 406 may involve classifying a graphical image representing the temporal data traffic fingerprint into one of a plurality of learned data traffic fingerprint types using the machine learning model, to deduce the device identifying information of the specified IoT device.

Figure 5:
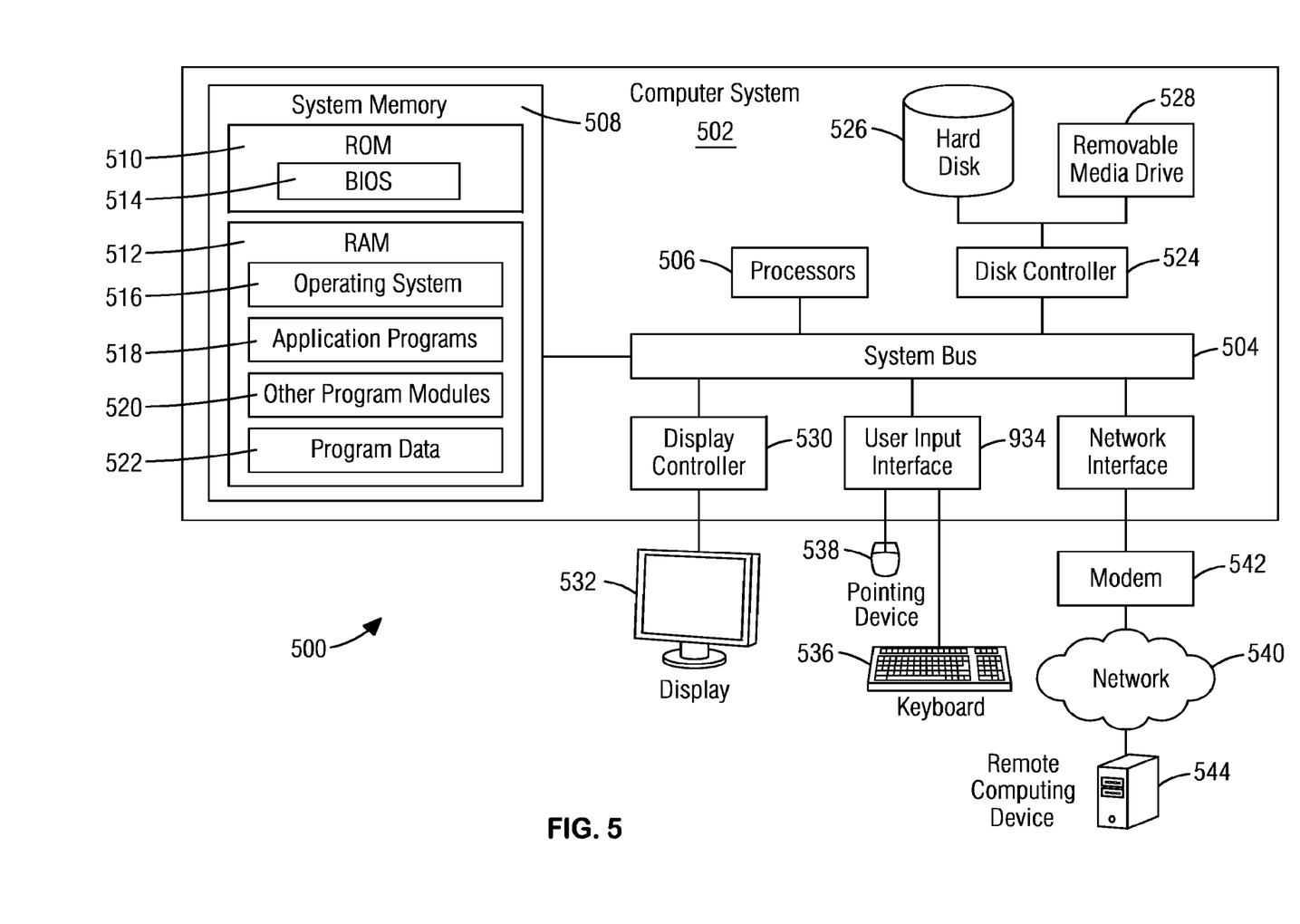
FIG. 5 illustrates an exemplary computing environment within which aspects of the present disclosure may be implemented.

FIG. 5 illustrates an exemplary computing environment 500 comprising a computer system 502, within which aspects of the present disclosure may be implemented. The computing system 502 may be configured, for example, as a network manager 120 as illustrated in FIG. 1. Computers and computing environments, such as computer system 502 and computing environment 500, are known to those of skill in the art and thus are described briefly here. It should be noted that where embodiments of the present disclosure implemented in a cloud environment, some of the items included in the exemplary computing environment 500 (e.g., keyboard 536) may not be applicable.

As shown in FIG. 5, the computer system 502 may include a communication mechanism such as a system bus 504 or other communication mechanism for communicating information within the computer system 502. The computer system 502 further includes one or more processors 506 coupled with the system bus 504 for processing the information. The processors 506 may include one or more central processing units (CPUs), graphical processing units (GPUs), or any other processor known in the art.

The computer system 502 also includes a system memory 508 coupled to the system bus 504 for storing information and instructions to be executed by processors 506. The system memory 508 may include computer readable storage media in the form of volatile and/or nonvolatile memory, such as read only memory (ROM) 510 and/or random access memory (RAM) 512. The system memory RAM 512 may include other dynamic storage device(s) (e.g., dynamic RANI, static RANI, and synchronous DRAM). The system memory ROM 510 may include other static storage device(s) (e.g., programmable ROM, erasable PROM, and electrically erasable PROM). In addition, the system memory 508 may be used for storing temporary variables or other intermediate information during the execution of instructions by the processors 506. A basic input/output system 514 (BIOS) containing the basic routines that help to transfer information between elements within computer system 502, such as during start-up, may be stored in system memory ROM 510. System memory RAM 512 may contain data and/or program modules that are immediately accessible to and/or presently being operated on by the processors 506. System memory 508 may additionally include, for example, operating system 516, application programs 518, other program modules 520 and program data 522.

The computer system 502 also includes a disk controller 524 coupled to the system bus 504 to control one or more storage devices for storing information and instructions, such as a magnetic hard disk 526 and a removable media drive 528 (e.g., floppy disk drive, compact disc drive, tape drive, and/or solid state drive). The storage devices may be added to the computer system 502 using an appropriate device interface (e.g., a small computer system interface (SCSI), integrated device electronics (IDE), Universal Serial Bus (USB), or FireWire).

The computer system 502 may also include a display controller 530 coupled to the system bus 504 to control a display 532, such as a cathode ray tube (CRT) or liquid crystal display (LCD), among other, for displaying information to a computer user. The computer system 502 includes a user input interface 534 and one or more input devices, such as a keyboard 536 and a pointing device 538, for interacting with a computer user and providing information to the one or more processors 506. The pointing device 538, for example, may be a mouse, a light pen, a trackball, or a pointing stick for communicating direction information and command selections to the one or more processors 506 and for controlling cursor movement on the display 532. The display 532 may provide a touch screen interface which allows input to supplement or replace the communication of direction information and command selections by the pointing device 538.

The computer system 502 may perform a portion or all of the processing steps of embodiments of the disclosure in response to the one or more processors 506 executing one or more sequences of one or more instructions contained in a memory, such as the system memory 508. Such instructions may be read into the system memory 508 from another computer readable storage medium, such as a magnetic hard disk 526 or a removable media drive 528. The magnetic hard disk 526 may contain one or more datastores and data files used by embodiments of the present disclosure. Datastore contents and data files may be encrypted to improve security. The processors 506 may also be employed in a multi-processing arrangement to execute the one or more sequences of instructions contained in system memory 508. In alternative embodiments, hard-wired circuitry may be used in place of or in combination with software instructions. Thus, embodiments are not limited to any specific combination of hardware circuitry and software.

The computer system 502 may include at least one computer readable storage medium or memory for holding instructions programmed according to embodiments of the disclosure and for containing data structures, tables, records, or other data described herein. The term "computer readable storage medium" as used herein refers to any medium that participates in providing instructions to the one or more processors 506 for execution. A computer readable storage medium may take many forms including, but not limited to, non-transitory, non-volatile media, volatile media, and transmission media. Non-limiting examples of non-volatile media include optical disks, solid state drives, magnetic disks, and magneto-optical disks, such as magnetic hard disk 526 or removable media drive 528. Non-limiting examples of volatile media include dynamic memory, such as system memory 508. Non-limiting examples of transmission media include coaxial cables, copper wire, and fiber optics, including the wires that make up the system bus 504. Transmission media may also take the form of acoustic or light waves, such as those generated during radio wave and infrared data communications.

The computing environment 500 may further include the computer system 502 operating in a networked environment using logical connections to one or more remote computers, such as remote computing device 544. Remote computing device 544 may be a personal computer (laptop or desktop), a mobile device, a server, a router, a network PC, a peer device or other common network node, and typically includes many or all of the elements described above relative to computer system 502. When used in a networking environment, computer system 502 may include a modem 542 for establishing communications over a network 540, such as the Internet. Modem 542 may be connected to system bus 504 via network interface 546, or via another appropriate mechanism.

Network 540 may be any network or system generally known in the art, including the Internet, an intranet, a local area network (LAN), a wide area network (WAN), a metropolitan area network (MAN), a direct connection or series of connections, a cellular telephone network, or any other network or medium capable of facilitating communication between computer system 502 and other computers (e.g., remote computing device 544). The network 540 may be wired, wireless or a combination thereof. Wired connections may be implemented using Ethernet, Universal Serial Bus (USB), RJ-6, or any other wired connection generally known in the art. Wireless connections may be implemented using Wi-Fi, WiMAX, and Bluetooth, infrared, cellular networks, satellite or any other wireless connection methodology generally known in the art. Additionally, several networks may work alone or in communication with each other to facilitate communication in the network 540.

The embodiments of the present disclosure may be implemented with any combination of hardware and software. In addition, the embodiments of the present disclosure may be included in an article of manufacture (e.g., one or more computer program products) having, for example, a non-transitory computer-readable storage medium. The computer readable storage medium has embodied therein, for instance, computer readable program instructions for providing and facilitating the mechanisms of the embodiments of the present disclosure. The article of manufacture can be included as part of a computer system or sold separately.

The computer readable storage medium can include a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. Computer readable program instructions described herein can be downloaded to respective computing/processing devices from a computer readable storage medium or to an external computer or external storage device via a network, for example, the Internet, a local area network, a wide area network and/or a wireless network.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A system for obtaining information about an Internet of Things (IoT) device connected to a network, the system comprising:
a data traffic collection point configured to collect data units communicated to or from a specified IoT device of a plurality of IoT devices connected to a network, wherein the data collection point is one of: the specified IoT device, a node of the network via which data units communicated to or from the specified IoT device passes, and a port of a network component linked to the specified IoT device, and
a computing system comprising one or more processors and a memory storing computational modules executable by the one or more processors, the computational modules comprising:
a data processing module configured to process quantitative information pertaining to the data units communicated to or from the specified IoT device collected over a defined time interval, to create a graphical image from the quantitative information, the graphical image representing a temporal data traffic fingerprint of the specified IoT device, and
an artificial intelligence module configured to deduce device identifying information of the specified IoT device by providing the graphical image as input to a machine learning model for classifying the graphical image into one of a plurality of learned data traffic fingerprint types.

2. The system according to claim 1, wherein the data traffic collection point is configured to collect data units communicated to or from the specified IoT device based on a device address or identifier of the specified IoT device.

3. The system according to claim 1, wherein the data traffic collection point is configured to collect data units communicated via a physical port linked to the specified IoT device, or via a virtual interface linked to the specified IoT device, or via a circuit comprising a combination of physical ports and/or virtual interfaces linked to the specified IoT device.

4. The system according to claim 1, wherein the data processing module is configured to process the quantitative information to create statistical information pertaining to the data units communicated to or from the specified IoT device over the defined time interval.

5. The system according to claim 4, wherein the statistical information includes number of data units per time interval per protocol or per a selected set of protocols.

6. The system according to claim 5, wherein:
the data units comprise Ethernet frames, and
the statistical information includes number of Ethernet frames per time interval per EtherType value, the EtherType value being indicative of an encapsulated protocol.

7. The system according to claim 4, wherein the statistical information includes number of data units per time interval per data prioritization class.

8. The system according to claim 4, wherein the statistical information includes data unit length distribution per time interval.

9. The system according to claim 4, wherein the statistical information comprises statistics on selected contents of payload of the data units per time interval.

10. The system according to claim 1, wherein the device identifying information comprises information on device type.

11. The system according to claim 10, wherein the device identifying information further comprises information on device type variant.

12. The system according to claim 1, wherein the system is embedded in a router-switch.

13. The system according to claim 1, wherein the system is distributed across of a plurality of computing devices.

14. A computer-implemented method for obtaining information about an Internet of Things (IoT) device connected to a network, the method comprising:
receiving a collection of data units communicated to or from a specified IoT device of a plurality of IoT devices connected to a network, wherein the data collection point is one of: the specified IoT device, a node of the network via which data units communicated to or from the specified IoT device passes, and a port of a network component linked to the specified IoT device,
processing, by a computing system, quantitative information pertaining to the data units communicated to or from the specified IoT device collected over a defined time interval, to create a graphical image from the quantitative information, the graphical image representing a temporal data traffic fingerprint of the specified IoT device, and
deducing, by the computing system, device identifying information of the specified IoT device by providing the graphical image as input to a machine learning model for classifying the graphical image into one of a plurality of learned data traffic fingerprint types.

15. The method according to claim 14, wherein the processing of the quantitative information comprises creating statistical information pertaining to the data units communicated to or from the specified IoT device over the defined time interval.

16. The method according to claim 15, wherein the statistical information comprises one or more of:
number of data units per time interval per protocol or per a selected set of protocols,
number of data units per time interval per data prioritization class,
data unit length distribution per time interval, and
statistics on selected contents of payload of the data units per time interval.

17. The method according to claim 14, wherein the device identifying information comprises information on device type.

18. A non-transitory computer-readable storage medium including instructions that, when processed by a computer, configure the computer to perform the method according to claim 14.

* * * * *